Dec. 13, 1927.
I. COWLES
1,652,765
FORCE FEED LUBRICATING DEVICE
Filed June 25, 1925
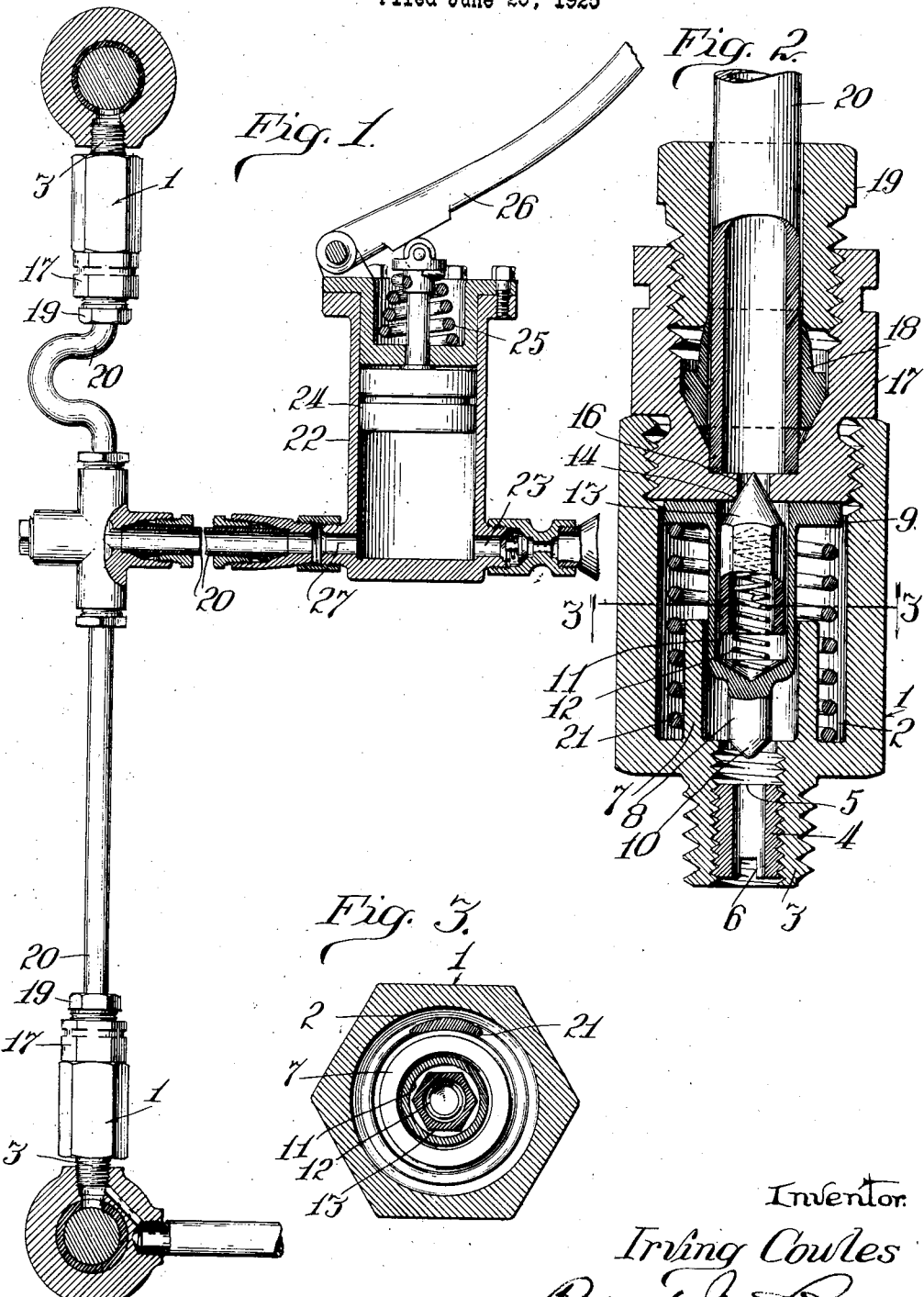
Inventor.
Irving Cowles Patented Dec. 13, 1927.

1,652,765

UNITED STATES PATENT OFFICE.

IRVING COWLES, OF CHICAGO, ILLINOIS, ASSIGNOR TO UNION BANK OF CHICAGO, TRUSTEE, OF CHICAGO, ILLINOIS, A CORPORATION OF ILLINOIS.

FORCE-FEED-LUBRICATING DEVICE.

Application filed June 25, 1925. Serial No. 39,502.

This invention has for its object to provide a very simple, cheap and efficient device for association with a pump and a device to be supplied with fluid delivered by the pump, for delivering to the said device a predetermined volume of the fluid under substantially the pressure at which the same is delivered from the pump.

The invention relates more particularly to force feed lubrication of bearings by means of a single pump associated with any desired number of bearings for simultaneously supplying lubricant to all of the latter and regulating the volume of the lubricant fed to each bearing according to its normal requirements with respect to the other bearings to thus prevent waste of lubricant.

A further object of the invention is to provide a device of the kind specified which is readily adjustable from its exterior to regulate the volume of fluid delivered therefrom at each actuation of the pump.

The present invention constitutes an improvement over the subject-matter of my pending application for Patent, Serial No. 752,916, filed Nov. 29, 1924.

The preferred embodiment of the invention is illustrated in the accompanying drawings, wherein:—

Fig. 1 is a view partly in section and partly in elevation, of a fluid pressure pump, a plurality of bearings equipped with devices constructed in accordance with the invention, and piping connecting the pump with said devices.

Fig. 2 is a central longitudinal section of a device constructed in accordance with the invention, for receiving fluid from the pumps and delivering a predetermined volume of said fluid to the bearing.

Fig. 3 is a transverse section of the same on the line 3—3 of Fig. 2.

It is obviously desirable that a force feed lubricating system shall be both cheap and efficient and shall be composed, mainly, of units that are all alike and, therefore, capable of being manufactured in large quantities at the least cost and with the least possible equipment. Devices that are perfectly adapted, by reason of size and design of component elements, for production by automatic screw-machines, are necessarily cheaper than devices requiring more manual handling than screw-machine products. A comparatively large latitude of adjustment of the device for feeding, for example, from a minimum of one or two drops of oil to a maximum of one hundred drops and which is so small and compact as to be capable of being mounted where only small space is available, is also very desirable, and such a device which is capable of being accurately adjusted from its exterior, by means of a screw-driver, just prior to mounting it on the bearing, is most advantageous.

The device of the present invention possesses all of the aforesaid desirable characteristics. It consists of the casing 1 made of hexagonal metal rod, preferably brass, which is provided with a cylindrical bore 2 extending from one end thereof to adjacent its other end, said casing being, in the instance illustrated, internally threaded at its open end.

Said casing 1 is provided at its other end with an externally and internally threaded stem 3 for connection with the bearing or other device to be lubricated. Within said stem 3 there is mounted an externally threaded sleeve 4, the bore of which terminates at one end in a valve-seat 5, the other end of said sleeve being provided with the transverse slot 6 for engagement with a screw-driver.

Within the casing 1 at the end thereof equipped with the stem 3, there is provided an annular flange 7 concentric with the bore 2 and with the valve-seat 5. This flange constitutes a guide for the piston-rod 8 of the piston 9 reciprocable within the casing and of sufficiently smaller diameter than the latter to permit the liquid, such as lubricating oil, to leak past the same. The area of the annular space around said piston should be less than the area of the bore of the sleeve 4 for reasons hereinafter set forth.

The lower end of the piston rod 8 constitutes a valve 10 to seat on the valve-seat 5, the lower end-portion of the piston rod 8 being of smaller diameter than its upper end-portion. The latter is hollow, the mouth of its bore 11 being in the outer face of the piston. This bore 11 receives the small helical compression spring 12 which also enters the bore of a reciprocable check-valve 13 having a polygonal peripheral surface and which seats on the valve-seat 14 at the delivery end of the feed port 16 of the removable head 17 of the casing. The latter is cut from hexagonal rod and constitutes a member of a compression pipe-coupling which includes the ferrule 18 and the nut 19 for swedging the ferrule upon the feed-tube 20. This particular type of compression coupling constitutes the subject-matter of my application for patent, filed April 25, 1925, Serial No. 25,873 and is merely exemplary of a means for connecting the casing 1 with a source of fluid under pressure.

A compression spring 21 is interposed between the piston 9 and the closed end of the casing 1 around the annular flange 7, the bore of the latter being of sufficiently larger diameter than the larger or hollow portion of the piston rod 8 to permit ready flow of liquid past said piston rod. The said flange 7 coacts with the bore of the casing 1 to guide the piston 9. The spring 21 is of such strength as to easily maintain the piston 9 in the position shown in Fig. 2 against the action of the spring 12 and also to force said piston to this position against the resistance of liquid by-passing said piston.

A suitable pump 22 is provided which is preferably connected by means of a check-valve controlled port 23 with a source of supply of oil or other liquid. The pump-piston 24 is preferably held at the outer limit of its movement by means of a spring 25 and is actuated against said spring by means of the lever 26. The discharge port 27 of said pump is preferably devoid of a check-valve and is suitably connected with the several feed devices or casings 1 by means of tubing 20. The omission of the check-valve from the discharge port of the pump is permissible because of the presence of the check-valves 13 in the casings 1.

The operation of the device is as follows:—

Upon depressing the piston 24 of the pump 22, fluid under pressure is discharged into the tubing 20. The pump pressure is preferably very high as, for example, 100 or more pounds per square inch while the springs exert a maximum pressure of only about six pounds per square inch fluid pressure equivalent.

The fluid is thus forced into the casings 1 with a rush and, as the casings 1 are filled with this fluid the onrushing fluid will instantly move the pistons 9 to the limits of their movement against the action of the springs 21, thus seating the valve-formations 10 on the valve-seats 5 and thus preventing further flow of fluid from the discharge ends of the casings 1 but causing the discharge from the latter of substantially the exact volume of fluid which enters the casing 1 in response to pump actuation. As the area of the discharge port of each casing is greater than that of the by-pass around the piston, the discharge of fluid will be in excess of leakage past the piston 9 during the stroke of the latter in view of the very slight resistance offered by the springs 21 in proportion to the pressure exerted by the pump-piston 24. The fluid is thus discharged from the casings 1 at substantially the pressure exerted by the pump-piston 24 and the volume discharged at each pump actuation from each of the casings 1 will be substantially the cross-sectional area of the bore of the casing 1 multiplied by the length of stroke of the piston 9.

The pump pressure is intended to be only momentary so that upon release of the lever 26 the piston will be returned to initial position and draw in through the intake port 23 the volume of fluid just discharged. The absence of a check-valve from the discharge port of the pump serves to relieve all pressure in the tubing but will not cause the fluid contained in the latter to return to the pump as is obvious. The check-valves 13 will trap the fluid discharged into the casings 1 and, upon releasing the lever 26, the pistons 9 will return to normal positions under the influence of the springs 21 at a speed determined by the degree of viscosity of the fluid and the total by-pass area around the piston, the fluid disposed between the pistons 9 and the intake ports of the casings being thus transferred to the discharge end portions of said casings 1.

To those skilled in the art, it will be instantly obvious that the feed devices may be made in very diminutive sizes, as well as large sizes, and at very small cost because of the fact that every component element except the springs is perfectly adapted for automatic screw-machine production and all parts are easily assembled.

The fact that the stroke of the piston 9 is easily adjusted from the exterior, makes installation speedy, it being obvious that accurate adjustment of the piston stroke is readily possible. Assuming that the maximum stroke of the piston occurs when the slotted end of the sleeve 4 is flush with the end of the stem 3 and that the threads of the sleeve 4 are thirty to the inch, then each full turn of said sleeve will decrease the piston stroke one-thirtieth of an inch. If the maximum piston stroke is, for example, thirty-one-hundredths of an inch and said maximum stroke delivers ninety drops of fluid, then each full turn of the sleeve 4 will decrease the discharge by three drops. The person installing the devices need only estimate the needs of each bearing and, after adjusting the sleeve 4 accordingly, mount the latter. To demount and readjust if the primary adjustment shall be found unsuited to the bearing, is a matter of ease as will be obvious.

It will be obvious, of course, that as soon as the valve-formation 10 is seated on the valve-seat 5, the fluid pressure on both sides of the piston will be equalized and the spring 21 be required only to overcome the proportion of the fluid pressure as is exerted upon the small area of the bore of the sleeve 4. If the pressure of the fluid trapped in the casing 1 is greater than the spring 21 can overcome to initiate return stroke of the piston, then, upon release of pump-pressure, the pressure within the casing 1 will be sufficiently relieved by leakage through the threaded association of the stem 3 and sleeve 4 to permit the spring 21 to perform its function.

I claim as my invention:

1. A device of the kind specified comprising a cylinder provided at its opposite ends with an inlet port and a discharge port respectively disposed axially of the same, a reciprocable piston loosely disposed within said cylinder for permitting leakage of fluid past the same at every point in its stroke, a hollow piston rod for said piston open at the end opposed to the intake port of the cylinder, a spring-held check-valve reciprocable in said piston-rod and seating on said intake port, the said piston-rod terminating at its other end in a valve-formation for seating on the discharge port as the piston attains one limit of its movement, and a spring disposed between the piston and the discharge end of the cylinder for normally maintaining said piston at the other limit of its movement against the action of the check-valve spring.

2. A device of the kind specified comprising a cylinder provided at its opposite ends with an inlet port and a discharge port respectively disposed axially of the same, a reciprocable piston loosely disposed within said cylinder for permitting leakage of fluid past the same at every point in its stroke, a hollow piston rod for said piston open at the end opposed to the intake port of the cylinder, a spring-held check-valve reciprocable in said piston-rod and seating on said intake port, the said piston-rod terminating at its other end in a valve-formation for seating on the discharge port as the piston attains one limit of its movement, and a spring disposed between the piston and the discharge end of the cylinder for normally maintaining said piston at the other limit of its movement against the action of the check-valve spring, the area of the discharge port of said cylinder being greater than the area of the space between the piston and the bore of the cylinder.

3. A device of the kind specified comprising a cylinder provided at its opposite ends with an inlet port and a discharge port respectively disposed axially of the same, a reciprocable piston loosely disposed within said cylinder for permitting leakage of fluid past the same at every point in its stroke, a hollow piston rod for said piston open at the end opposed to the intake port of the cylinder, a spring-held check-valve reciprocable in said piston rod and seating on said intake port, the said piston rod terminating at its other end in a valve-formation for seating on the discharge port as the piston attains one limit of its movement, an annular flange within and concentric with the cylinder at the discharge end portion thereof and into which the piston rod projects at all times for guidance, the inner diameter of said flange being sufficiently greater than that of the piston rod to permit free flow of fluid around the latter to said discharge port, and a spring disposed between the piston and the discharge end of the cylinder for normally maintaining said piston at the other limit of its movement against the action of the check-valve spring, said piston-spring being disposed around said annular flange.

4. A device of the kind specified comprising a cylinder having an inlet port and a discharge port disposed axially thereof at opposite ends, a sleeve adjustably mounted in said discharge port, a piston reciprocable in said cylinder and equipped with a piston rod provided at its outer end with a valve-formation for seating at one end of the bore of said sleeve, there being a central bore in the other end of said piston extending through the piston, a spring-held check-valve reciprocably mounted in said bore and seating on the inlet port of the cylinder, and a spring for maintaining the piston normally at the intake end of the cylinder against the action of said check-valve spring, the diameters of the piston and cylinder being such as to permit leakage of fluid past said piston at all points in the stroke of the latter, said stroke being adjustable by varying the position of said sleeve in the discharge port.

5. A device of the kind specified comprising a cylinder having an inlet port and a discharge port disposed axially thereof at opposite ends, a sleeve adjustably mounted in said discharge port, a piston reciprocable in said cylinder and equipped with a piston rod provided at its outer end with a valve-formation for seating at one end of the bore of said sleeve, there being a central bore in the other end of said piston extending through the piston, a spring-held check-valve reciprocably mounted in said bore and seating on the inlet port of the cylinder, and a spring for maintaining the piston normally at the intake end of the cylinder against the action of said check-valve spring, the diameters of the piston and cylinder being such as to permit leakage of fluid past said piston at all points in the stroke of the latter, said stroke being adjustable by varying the position of said sleeve in the discharge port, the total area of the leakage space around the piston being less than the area of the bore of said sleeve.

6. A device of the kind specified comprising a cylinder having an inlet port and a discharge port disposed axially thereof at opposite ends, an annular flange within and concentric with said cylinder at the discharge end of the latter, a sleeve adjustably mounted in said discharge port, a piston reciprocable in said cylinder and equipped with a piston rod provided at its outer end with a valve-formation for seating at one end of the bore of said sleeve, said piston rod being loosely disposed within said annular flange for guidance by the latter and permitting free flow of fluid past the same, there being a central bore in the other end of said piston extending through the piston, a spring-held check-valve reciprocably mounted in said bore and seating on the inlet port of the cylinder, and a spring for maintaining the position normally at the intake end of the cylinder against the action of said check-valve spring, the diameters of the piston and cylinder being such as to permit leakage of fluid past said piston at all points in the stroke of the latter, said stroke being adjustable by varying the position of said sleeve in the discharge port.

7. A device of the kind specified comprising a cylinder having an inlet port and a discharge port disposed axially thereof at opposite ends, an annular flange within and concentric with said cylinder at the discharge end of the latter, a sleeve adjustably mounted in said discharge port, a piston rod provided at its outer end with a valve-formation for seating at one end of the bore of said sleeve, said piston rod being loosely disposed within said annular flange for guidance by the latter and permitting free flow of fluid past the same, there being a central bore in the other end of said piston extending through the piston, a spring-held check-valve reciprocably mounted in said bore and seating on the inlet port of the cylinder, and a spring for maintaining the position normally at the intake end of the cylinder against the action of said check-valve spring, the diameters of the piston and cylinder being such as to permit leakage of fluid past said piston at all points in the stroke of the latter, said stroke being adjustable by varying the position of said sleeve in the discharge port, the total area of the leakage space around the piston being less than the area of the bore of said sleeve.

8. A device of the kind specified comprising a cylinder having an inlet port and a discharge port disposed axially thereof at opposite ends, a sleeve adjustably mounted in said discharge port, a piston reciprocable in said cylinder and equipped with a piston rod provided at its outer end with a valve-formation for seating at one end of the bore of said sleeve, there being a central bore in the other end of said piston extending through the piston, a spring-held check-valve reciprocably mounted in said bore and seating on the inlet port of the cylinder, and a spring for maintaining the piston normally at the intake end of the cylinder against the action of said check-valve spring, said piston spring being disposed in part in the annular space between the cylinder wall and said piston, the diameters of the piston and cylinder being such as to permit leakage of fluid past said piston at all points in the stroke of the latter, said stroke being adjustable by varying the position of said sleeve in the discharge port.

9. A device of the kind specified comprising a cylinder having an inlet port and a discharge port disposed axially thereof at opposite ends, an annular flange within and concentric with said cylinder at the discharge end of the latter, a sleeve adjustably mounted in said discharge port, a piston reciprocable in said cylinder and equipped with a piston rod provided at its outer end with a valve-formation for seating at one end of the bore of said sleeve, said piston rod being loosely disposed within said annular flange for guidance by the latter and permitting free flow of fluid past the same, there being a central bore in the other end of said piston extending through the piston, a spring-held check-valve reciprocably mounted in said bore and seating on the inlet port of the cylinder and a spring for maintaining the position normally at the intake end of the cylinder against the action of said check-valve spring, said piston spring being disposed in part in the annular space between the cylinder wall and said annular flange, the diameters of the piston and cylinder being such as to permit leakage of fluid past said piston at all points in the stroke of the latter, said stroke being adjustable by varying the position of said sleeve in the discharge port.

10. A device of the kind specified comprising a cylinder having an inlet port and a discharge port disposed axially thereof at opposite ends, an annular flange within and concentric with said cylinder at the discharge end of the latter, a sleeve adjustably mounted in said discharge port, a piston reciprocable in said cylinder and equipped with a piston rod provided at its outer end with a valve-formation for seating at one end of the bore of said sleeve, said piston rod being loosely disposed within said annular flange for guidance by the latter and permitting free flow of fluid past the same, there being a central bore in the other end of said piston extending through the piston, a spring-held check-valve reciprocably mounted in said bore and seating on the inlet port of the cylinder and a spring for maintaining the piston normally at the intake end of the cylinder against the action of said check-valve spring, said piston spring being disposed in part in the annular space between the cylinder wall and said annular flange, the diameters of the piston and cylinder being such as to permit leakage of fluid past said piston at all points in the stroke of the latter, said stroke being adjustable by varying the position of said sleeve in the discharge port, the total area of the leakage space around the piston being less than the area of the bore of said sleeve.

11. A device of the kind specified comprising a cylinder provided at its opposite ends with an inlet port and a discharge port respectively disposed axially of the same, a reciprocable piston loosely disposed within said cylinder for permitting leakage of fluid past the same at every point in its stroke, said piston terminating at one end in a valve-formation seating on the discharge port, the latter being of greater area than the free space between the piston and the cylinder-bore, and a spring for maintaining the piston normally at the intake end of the cylinder.

12. A device of the kind specified comprising a cylinder provided at its opposite ends with an inlet port and a discharge port respectively disposed axially of the same, a reciprocable piston loosely disposed within said cylinder for permitting leakage of fluid past the same at every point in its stroke, valve formations at opposite ends of the piston for seating on said respective ports, one thereof being movable relatively to the piston for seating on the intake port, and a spring for maintaining the piston normally at the intake end of the cylinder.

13. A device of the kind specified comprising a cylinder provided at its opposite ends with an inlet port and a discharge port respectively disposed axially of the same, a reciprocable piston loosely disposed within said cylinder for permitting leakage of fluid past the same at every point in its stroke, valve formations at opposite ends of the piston for seating on said respective ports, one thereof being movable relatively to the piston for seating on the intake port, and a spring for maintaining the piston normally at the intake end of the cylinder, the discharge port of the cylinder being of greater area than the free space around the piston.

14. A device of the kind specified comprising a cylinder having axially aligned intake and discharge ports at its opposite ends, a pair of spring-held members normally disposed at and maintaining the intake end of said cylinder closed, one of said members adapted to move to seal the discharge end of said cylinder in response to flow of fluid under pressure into said cylinder through the intake port, said members permitting leakage of fluid past the same at every point in the movement thereof, the member adapted to seal the discharge port carrying the other of said members and the spring therefor.

15. A device of the kind specified comprising a cylinder having axially aligned intake and discharge ports at its opposite ends, a pair of members normally disposed at and maintaining the intake end of said cylinder closed, one of said members adapted to move to and seal the discharge end of said cylinder in response to flow of fluid under pressure into said cylinder through the intake port, said members permitting leakage of fluid past the same at every point in the movement thereof, the member for sealing the discharge port being spring-held to normally maintain said port open, said last named member carrying the other of said members and a spring for maintaining the same sealed at the intake port.

IRVING COWLES.